United States Patent
Appaiah et al.

(10) Patent No.: US 11,784,916 B2
(45) Date of Patent: Oct. 10, 2023

(54) INTELLIGENT CONTROL PLANE COMMUNICATION

(71) Applicant: EMC IP Holding Company LLC, Hopkinton, MA (US)

(72) Inventors: Akash B. Appaiah, Cork (IE); Julie Zhivich, Westborough, MA (US); Jason J. Duquette, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 55 days.

(21) Appl. No.: 17/383,720

(22) Filed: Jul. 23, 2021

(65) Prior Publication Data

US 2023/0026171 A1    Jan. 26, 2023

(51) Int. Cl.
*G06F 15/16* (2006.01)
*H04L 45/00* (2022.01)
*H04L 45/16* (2022.01)
*H04L 45/24* (2022.01)

(52) U.S. Cl.
CPC .............. *H04L 45/22* (2013.01); *H04L 45/16* (2013.01); *H04L 45/24* (2013.01); *H04L 2212/00* (2013.01)

(58) Field of Classification Search
CPC ........ H04L 45/22; H04L 45/245; H04L 45/28
See application file for complete search history.

(56) References Cited

U.S. PATENT DOCUMENTS

| | | | | |
|---|---|---|---|---|
| 7,362,709 B1 * | 4/2008 | Hui | .......................... | H04L 45/02 709/239 |
| 2015/0009799 A1 * | 1/2015 | Sawada | ............... | H04L 12/4637 370/216 |
| 2016/0269322 A1 * | 9/2016 | Nakagawa | ............ | H04L 49/505 |
| 2017/0324664 A1 * | 11/2017 | Xu | ........ | H04L 12/4633 |
| 2022/0078104 A1 * | 3/2022 | Yallouz | ................... | H04L 41/12 |
| 2022/0124025 A1 * | 4/2022 | Li | ........................ | H04L 47/115 |

OTHER PUBLICATIONS

Bo Hu, Xin Li, Yuehui Jin and Shanzhi Chen, "Local route optimization in hierarchical mobile IPv6 networks from topologies perspective," IEEE International Symposium on Communications and Information Technology, 2005. ISCIT 2005., Beijing, 2005, pp. 813-816 (Year: 2005).*

(Continued)

*Primary Examiner* — Oscar A Louie
*Assistant Examiner* — Messeret F Gebre
(74) *Attorney, Agent, or Firm* — Muirhead and Saturnelli, LLC

(57) ABSTRACT

A control node and/or a storage processing node maybe configured to modify a control path between a control node and storage processing node to include at least a portion of a data fabric and another processing node. Control communications may be sent over the data fabric by encapsulating control information that is configured in accordance with a first technology of the control fabric within communications configured in accordance with a second technology of the data fabric. Control switching logic may include logic to switch to a modified control path that includes at least a portion of a data fabric: in response to a failure of the control path; to load balance management activity; and/or improve QoS of management activity.

21 Claims, 7 Drawing Sheets

(56) References Cited

OTHER PUBLICATIONS

D. Wu, J. He, H. Wang, C. Wang and R. Wang, "A hierarchical packet forwarding mechanism for energy harvesting wireless sensor networks," in IEEE Communications Magazine, vol. 53, No. 8, pp. 92-98, Aug. 2015 (Year: 2015).*

A. Lankes, T. Wild and A. Herkersdorf, "Hierarchical NoCs for Optimized Access to Shared Memory and IO Resources," 2009 12th Euromicro Conference on Digital System Design, Architectures, Methods and Tools, Patras, Greece, 2009, pp. 255-262 (Year: 2009).*

* cited by examiner

INTELLIGENT CONTROL PLANE COMMUNICATION

BACKGROUND

Technical Field

The subject matter of this disclosure is generally related to electronic data storage, and more particularly to control plane communication on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method includes: exchanging first control communications between a control node of a storage system and a first I/O processing node of a storage system along a first communication path internal to the storage system including a control fabric, wherein the control fabric is configured for exchanging control communications between the control node and a plurality of I/O processing nodes of the storage system including the first I/O processing node and a second I/O processing node, and wherein each of the plurality of I/O processing nodes are communicatively coupled to a data fabric that is physically separate and distinct from the control fabric; modifying the first communication path to produce a second communication path internal to the storage system, wherein the second communication path includes at least a segment of the data fabric; and exchanging second control communications between the control node and the first I/O processing node along the second communication path. Exchanging the second control communications may include, on at least the segment of the data processing network: configuring the second control communications in accordance with a second communication protocol used by the data fabric; and encapsulating control information configured in accordance with a first communication protocol used by the control fabric within the second control communications. Modifying the first communication path may be performed in response to a failing of at least a part of the first communication path between the control node and the first I/O processing node. Modifying the first communication path may include adding the second I/O processing node to the first communication path to produce a second communication path. The method further may include determining to improve a quality of service for a control operation to be performed by the control node for the first I/O processing node, wherein modifying the first communication path may be performed in response to the determining. The method further may include determining to reduce a load of control communications on the control network, and modifying the first communication path may be performed in response to the determining. The data fabric may be at least an order of magnitude faster than the control fabric.

In another embodiment of the invention, a system includes executable logic that implements a method including: exchanging first control communications between a control node of a storage system and a first I/O processing node of a storage system along a first communication path internal to the storage system including a control fabric, wherein the control fabric is configured for exchanging control communications between the control node and a plurality of I/O processing nodes of the storage system including the first I/O processing node and a second I/O processing node, and wherein each of the plurality of I/O processing nodes are communicatively coupled to a data fabric that is physically separate and distinct from the control fabric; modifying the first communication path to produce a second communication path internal to the storage system, wherein the second communication path may include at least a segment of the data fabric; and exchanging second control communications between the control node and the first I/O processing node along the second communication path. Exchanging the second control communications may include, on at least the segment of the data processing network: configuring the second control communications in accordance with a second communication protocol used by the data fabric; and encapsulating control information configured in accordance with a first communication protocol used by the control fabric within the second control communications. Modifying the first communication path may be performed in response to a failing of at least a part of the first communication path between the control node and the first I/O processing node. Modifying the first communication path may include adding the second I/O processing node to the first communication path to produce a second communication path. The method further may include determining to improve a quality of service for a control operation to be performed by the control node for the first I/O processing node, where modifying the first communication path may be performed in response to the determining. The method further may include determining to reduce a load of control communications on the control network, where modifying the first communication path may be performed in response to the determining. The data fabric may be at least an order of magnitude faster than the control fabric.

In another embodiment of the invention, computer-readable media has software stored thereon including: executable code that controls exchanging first control communications between a control node of a storage system and a first I/O processing node of a storage system along a first communication path internal to the storage system including a control fabric, wherein the control fabric is configured for exchanging control communications between the control node and a plurality of I/O processing nodes of the storage system including the first I/O processing node and a second I/O processing node, and wherein each of the plurality of I/O processing nodes are communicatively coupled to a data fabric that is physically separate and distinct from the control fabric; executable code that controls modifying the first communication path to produce a second communication path internal to the storage system, wherein the second communication path includes at least a segment of the data fabric; and executable code that controls exchanging second control communications between the control node and the first I/O processing node along the second communication path. Exchanging the second control communications may include, on at least the segment of the data processing network: configuring the second control communications in accordance with a second communication protocol used by the data fabric; and encapsulating control information configured in accordance with a first communication protocol used by the control fabric within the second control communications. Modifying the first communication path may be performed in response to a failing of at least a part of the first communication path between the control node and the first I/O processing node. Modifying the first communication path may include adding the second I/O processing node to the first communication path to produce a second communication path. The software further may include: executable code that controls determining to improve a quality of service for a control operation to be performed by the control node for the first I/O processing node, wherein modifying the first communication path may be performed in response to the determining. The software further may include executable code that controls determining to reduce a load of control communications on the control network, where modifying the first communication path may be performed in response to the determining.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 1:
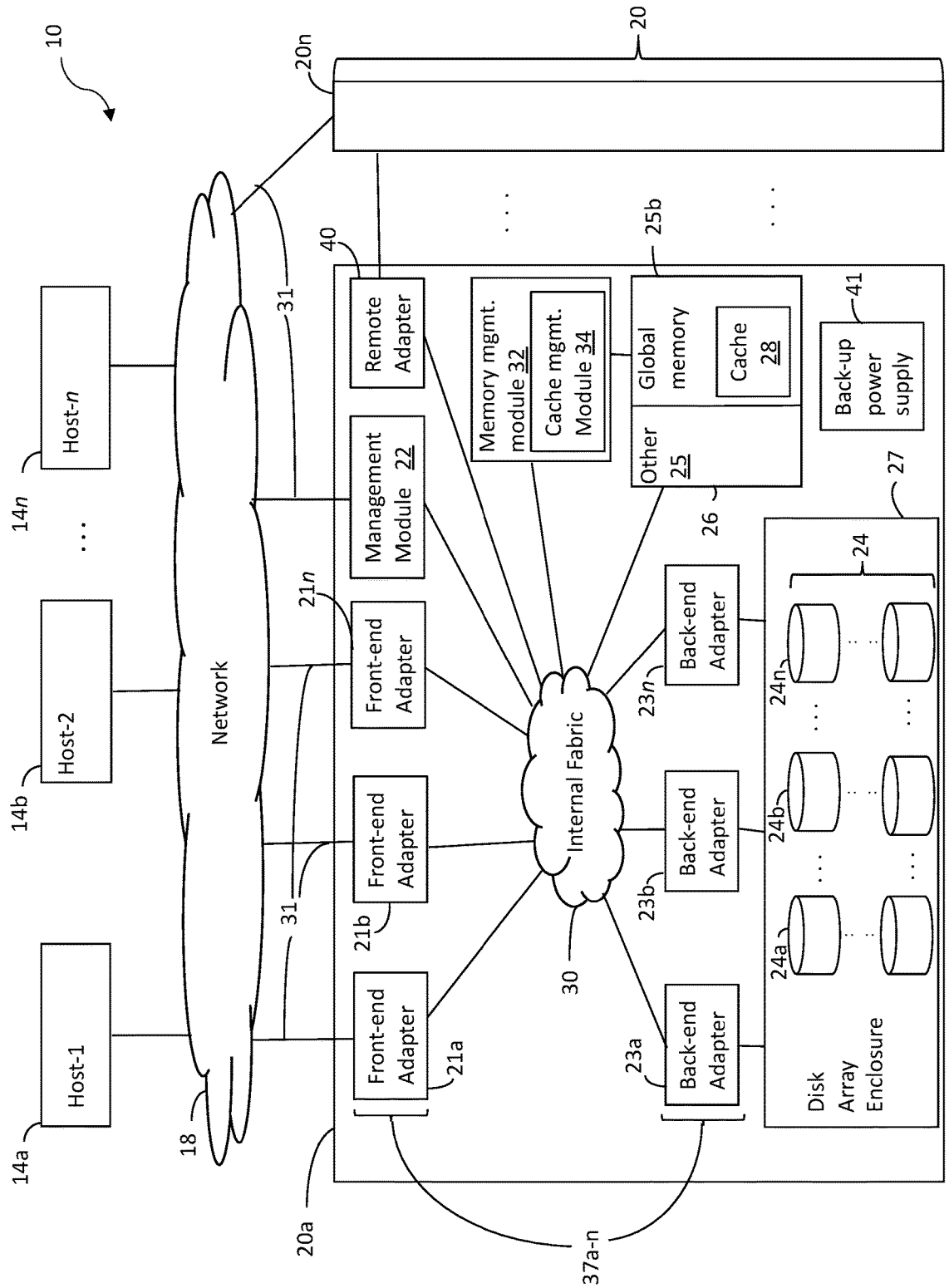
FIG. 1 is a block diagram illustrating an example of a data storage network, according to embodiments of the invention.

Some storage systems include a plurality of physically discrete storage processing nodes (e.g., circuit boards) that include a plurality of components for providing data services for hosts, including processing I/O operations, as described in more detail herein. The storage processing nodes may be interconnected with each other, global memory and other components by an internal fabric for processing I/O operations, which may be referred to as a "data fabric." The storage processing nodes also may be interconnected with each other and control nodes by another internal fabric, separate and discrete from the data fabric, for management of aspects of the storage system, where such internal fabric may be referred to herein as a "control fabric." A control node may be configured to manage components on the storage system, including components within storage processing nodes, over the control fabric. Management functions may include, but are not limited to, running scripts, initiating (e.g., booting) storage system components, updating software and firmware of storage system components, and/or providing a support interface for a customer and/or support personnel.

On some storage systems, a data fabric is configured (e.g., physically and via technology protocols) to operate substantially faster than (e.g., an order of magnitude or even more) a control fabric, for example, because of the volume of I/O processing activity compared to management activity and/or the priority of processing I/O operations over management of the storage system. For example, the data fabric may be configured to implement an InfiniBand (IB) standard, and the control fabric may be configured to implement a slower Ethernet standard.

On some storage systems, while a storage processing node may be connected to both the data fabric and control fabric of a storage system, a control node may be connected only to a control fabric. In such embodiments, if a portion of the control path between a control node and a storage processing node (or other component of the storage system) including the control fabric fails, it may not be possible for the control node to exchange control communications with the storage processing node.

Furthermore, it may be a desirable to provide a better quality of service (QoS) for management functions, for example, if there is a high volume of management activity and/or one or more bandwidth-intensive activities (e.g., a large software install or upgrade). However, it may not be possible to improve the QoS (at least not to the degree desired) using only the control fabric.

In addition, if one or more processing nodes have an unusually high amount of management activity, it may be desirable to better balance the load of management activity with other activity on the storage system. However, the ability to load balance using the control fabric alone may be unsatisfactory.

What may be desirable is a way to improve load balancing and QoS of management activity on a storage system, and a way to failover a failed control path.

Described herein are techniques and mechanisms for improving load balancing and QoS of management activity on a storage system, and for providing failover for a failed control path. A control node and/or a storage processing node may be configured to modify a control path between a control node and storage processing node to include at least a portion of a data fabric and another processing node. For example, a control node and/or storage processing node may be configured with control switching logic (CSL) that can switch from sending control communications on the control fabric (or exclusively on the control fabric) to sending control communications on a modified control path that includes the data fabric and another storage processing component.

Control communications on the control fabric may be configured in accordance with a first technology, for example, an Ethernet protocol, whereas I/O processing communications on the data fabric may be configured in accordance with a second technology, for example, an IB protocol. Control communications may be sent over the data fabric by encapsulating control information that is configured in accordance with the first technology within communications configured in accordance with the second technology.

The CSL may include logic to switch to a modified control path: in response to a failure of the control path; to load balance management activity; and/or improve QoS of management activity.

It should be appreciated that, while embodiments of the invention are described in relation to storage systems, the invention is not so limited, and may apply to other types of systems.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also may be referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEs and FAs. For example, an EDS may perform processing that manages metadata tables of information used by other directors such as BEs in connection with I/O operations, data deduplication, and the like.

Storage system 20a also may include a management module 22, which may be configured (e.g., dedicated) to perform storage management functions or services such as, for example, storage provisioning, device configuration, tier management, other services, or any combination of other services. The management module 22 also may be configured to perform, or assist in performing analysis such as, for example, performance and/or utilization analysis and/or forecasting of system behavior, the result of which may inform other management functions performed by the management module 22. The management module 22 may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n, as an independent management server, or as part of another separate system connected to storage system 20a via network 18. In some embodiments, the management and analysis functions described herein may be performed using both resource of the management module 22 of the storage system 20a and one management resources located externally to the storage system, for example, on a host system, management server and/or other components.

The FAs, BEs, EDSs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, EDSs 29, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14*a-n*) may be notified that the write operation has completed. At a later time, the write data may be de-staged from cache 28 to one or more physical storage devices 24*a-n*, such as by a BE.

The memory 26 may include persistent memory for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20*a* to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

The storage system 20*a* may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20*a* (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20*a* may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, EDS, BE, FA and the like), techniques herein may be performed in a physical storage system including one or more emulated or virtualized components (e.g., emulated or virtualized ports, emulated or virtualized EDSs, BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Any of storage systems 20*a-n*, or one or more components thereof, described in relation to FIG. 1 may be implemented using one or more Symmetrix™, VMAX™, VMAX3™ or PowerMax™ systems made available from Dell EMC.

Host systems 14*a-n* may provide data and control (e.g., management and access control) information to storage systems 20*a-n* over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

In some embodiments of the invention, protection group assignments of protection group clusters (PGCs) may be managed, for example, as will now be described.

Figure 2:
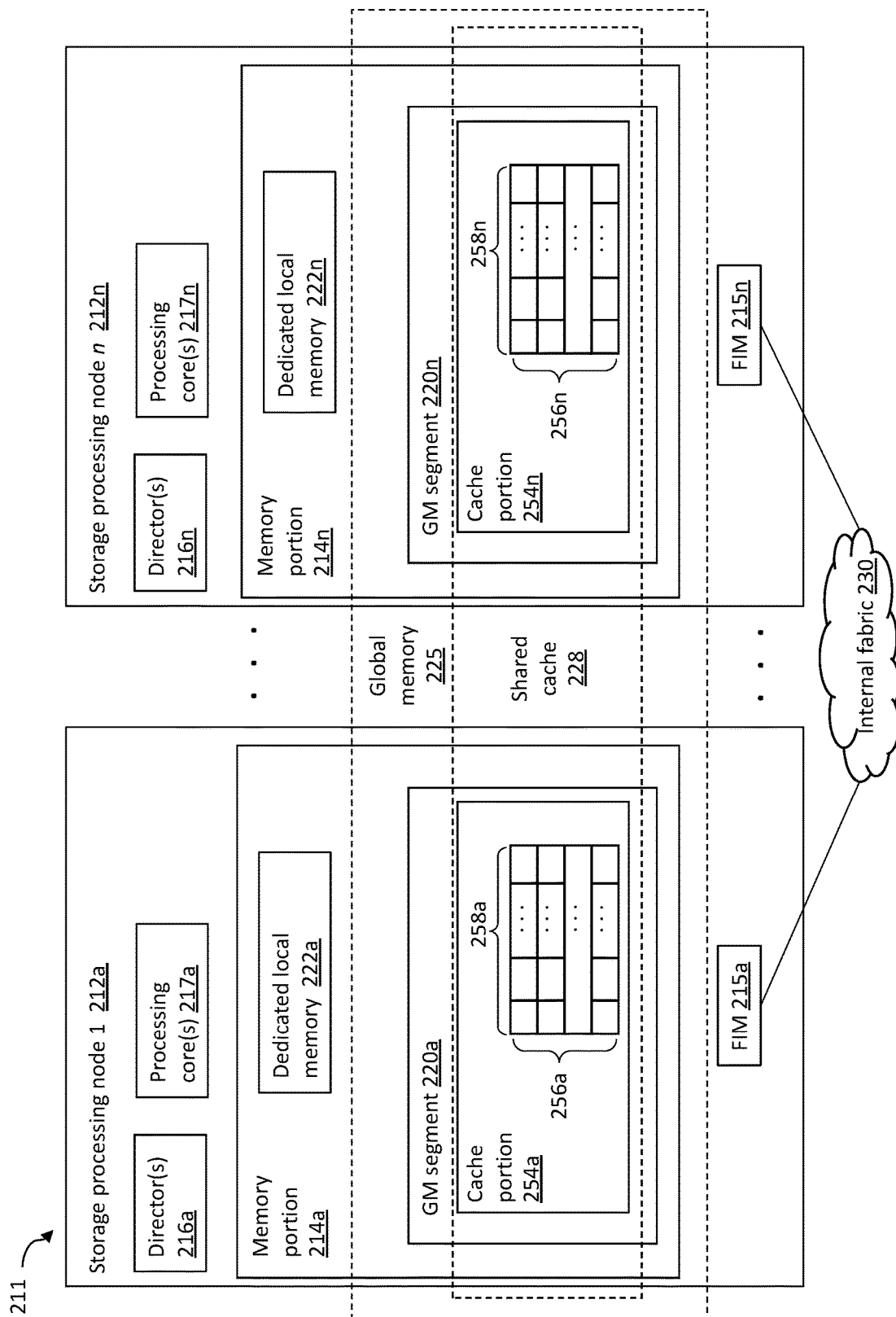
FIG. 2 is a block diagram illustrating a storage system including multiple physically discrete storage processing nodes, according to embodiments of the invention.

FIG. 2 is a block diagram illustrating an example of at least a portion 211 of a storage system (e.g., 20*a*) including multiple, physically discrete storage processing nodes (e.g., circuit boards) 212*a*-212*n*, which may be referred to herein as "processing nodes." Storage system 211 may include a plurality of processing nodes 212*a*-212*n* and a fabric 230 (e.g., internal fabric 30) over which the processing nodes 212*a-n* may communicate. Each of the processing nodes 212*a*-212*n* may include components thereon as illustrated. The switching fabric 230 may include, for example, one or more switches and connections between the switch(es) and processing nodes 212*a*-212*n*. In at least one embodiment, the fabric 230 may be an IB fabric. The fabric 230 may be used for processing I/O operations, for example, as part of a data plane, as opposed to being used for management communications as part of a control plane, and as such may be considered a data fabric, as opposed to a control fabric. In some embodiments, multiple processing nodes 212*a-n* may be implemented on a single physically discrete component; e.g., two processing nodes 212*a-n* may be implemented on single engine of PowerMax storage system.

In the following paragraphs, further details are described with reference to processing node 212*a* but each of the N processing nodes in a system may be similarly configured. For example, processing node 212*a* may include any of: one or more directors 216*a* (e.g., directors 37*a-n*); memory portion 214*a*; one or more processing cores 217*a* including compute resources, for example, as part of a CPUs and/or a CPU complex for processing I/O operations; and a fabric interface module (FIM) 215*a* for interfacing the processing node 212*a* to an internal fabric 230. Each director 216*a* may be configured to operate, such as by executing code, as any one or more of an FA, BE, RA, and the like. In some embodiments, each of the directors, or a portion thereof, are implemented in software stored in a memory portion 214*a* (e.g., in a dedicated local memory 222*a*) that is executed by one or more of the processing cores 217*a*. Such software implementation of directors may be considered emulations of types of physical directors (i.e., directors implemented (at least primarily) in hardware).

Each FIM 215*a-n* may include one or more host channel adapters (HCAs) that physically couple, and are configured to enable communication between, its respective processing node 212*a-n*, and the internal fabric 230. In some embodiments, the internal fabric 230 may include multiple (e.g., 2) switches, and each HCA 215*a-n* may have multiple (e.g., 2) ports, each one connected directly to one of the switches.

Each of the processing nodes 212*a-n* may, respectively, also include memory portions 214*a-n*. The memory portion of each processing node may be characterized as locally accessible with respect to that particular processing node, and more specifically with respect to other components on the same processing node. For example, processing node 212*a* includes memory portion 214*a* which is memory that is local to that particular processing node 212*a*. Data stored in memory portion 214*a* may be directly accessed by any of the processing cores 217*a* (e.g., executing instructions on behalf of one of the directors 216*a*) of the processing node 212*a*. For example, memory portion 214*a* may be a fast memory (e.g., DIMM (dual inline memory module) DRAM (dynamic random access memory)) that is locally accessible by a director 216*a*, where data from one location in 214*a* may be copied to another location in 214*a* directly using DMA operations (e.g., local memory copy operations) issued by director 216*a*. Thus, the director 216*a* may directly access data of 214*a* locally without communicating over the fabric 230.

The memory portions 214*a*-214*n* of processing nodes 212*a-n* may be further partitioned into different portions or segments for different uses. For example, each of the memory portions 214*a*-214*n* may respectively include GM segments 220*a-n* configured for collective use as segments of a distributed GM, for example, GM 225 (e.g., GM 25*b*). Thus, data stored in any GM segment 220*a-n* may be accessed by any director 216*a-n* on any processing node 212*a-n*. Additionally, each of the memory portions 214*a-n* may respectively include dedicated local memories 222*a-n*. Each of the dedicated local memories 222*a-n* are respectively configured for use locally by the one or more directors 216*a-n*, and possibly other components, residing on the same single processing node. In at least one embodiment where there is a single director denoted by 216*a* (and generally by each of 216*a-n*), data stored in the dedicated local memory 222*a* may be accessed by the respective single director 216*a* located on the same processing node 212*a*. However, the remaining directors located on other ones of the N processing nodes may not access data stored in the dedicated local memory 222*a*.

To further illustrate, GM segment 220*a* may include information such as user data stored in the cache portion 220*a*, metadata, and the like, that is accessed (e.g., for read and/or write) generally by any director of any of the processing nodes 212*a-n*. Thus, for example, any director 216*a-n* of any of the processing nodes 212*a-n* may communicate over the fabric 230 to access data in GM segment 220*a*. In a similar manner, any director 216*a-n* of any of the processing nodes 212*a-n* may generally communicate over fabric 230 to access any GM segment 220*a-n* of the distributed GM. Although a particular GM segment, such as 220*a*, may be locally accessible to directors on one particular processing node, such as 212*a*, any director of any of the processing nodes 212*a-n* may generally access the GM segment 220*a*. Additionally, the director 216*a* also may use the fabric 230 for data transfers to and/or from GM segment 220*a* even though 220*a* is locally accessible to director 216*a* (without having to use the fabric 230).

Also, to further illustrate, dedicated local memory 222*a* may be a segment of the memory portion 214*a* on processing node 212*a* configured for local use solely by components on the single/same processing node 212*a*. For example, dedicated local memory 222*a* may include data described in following paragraphs which is used and accessed only by directors 216*a* included on the same processing node 212*a* as the dedicated local memory 222*a*. In at least one embodiment in accordance with techniques herein and as described elsewhere herein, each of the dedicated local memories 222*a-n* may include a local page table or page directory used, respectively, by only director(s) 216*a-n* local to each of the processing nodes 212*a-n*.

In such an embodiment as in FIG. 2, the GM segments 220*a-n* may be logically concatenated or viewed in the aggregate as forming one contiguous GM logical address space of a distributed GM. In at least one embodiment, the distributed GM formed by GM segments 220*a-n* may include the cache portion 254*a*, various metadata and/or structures, and other information, as described in more detail elsewhere herein. Consistent with discussion herein, the cache portion 254*a*, having cache slots allocated from GM segments 220*a-n*, may be used to store I/O data (e.g., for servicing read and write operations).

Each cache portion 254*a-n* may be a portion of a shared cache 228 (e.g., cache 28) distributed across the processing nodes 212*a-n*, where the shared cache 228 may be considered a part of the GM 225. The cache portion 254*a-n* may include a plurality of cache slots 256*a-n*, each cache slot including one or more (e.g., 16) sections 258*a-n*. Each cache slot 256*a-n* may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

In some embodiments of the invention, it may be desirable to use a data fabric for control communications, for example, under certain circumstances, as will now be described.

Figure 3:
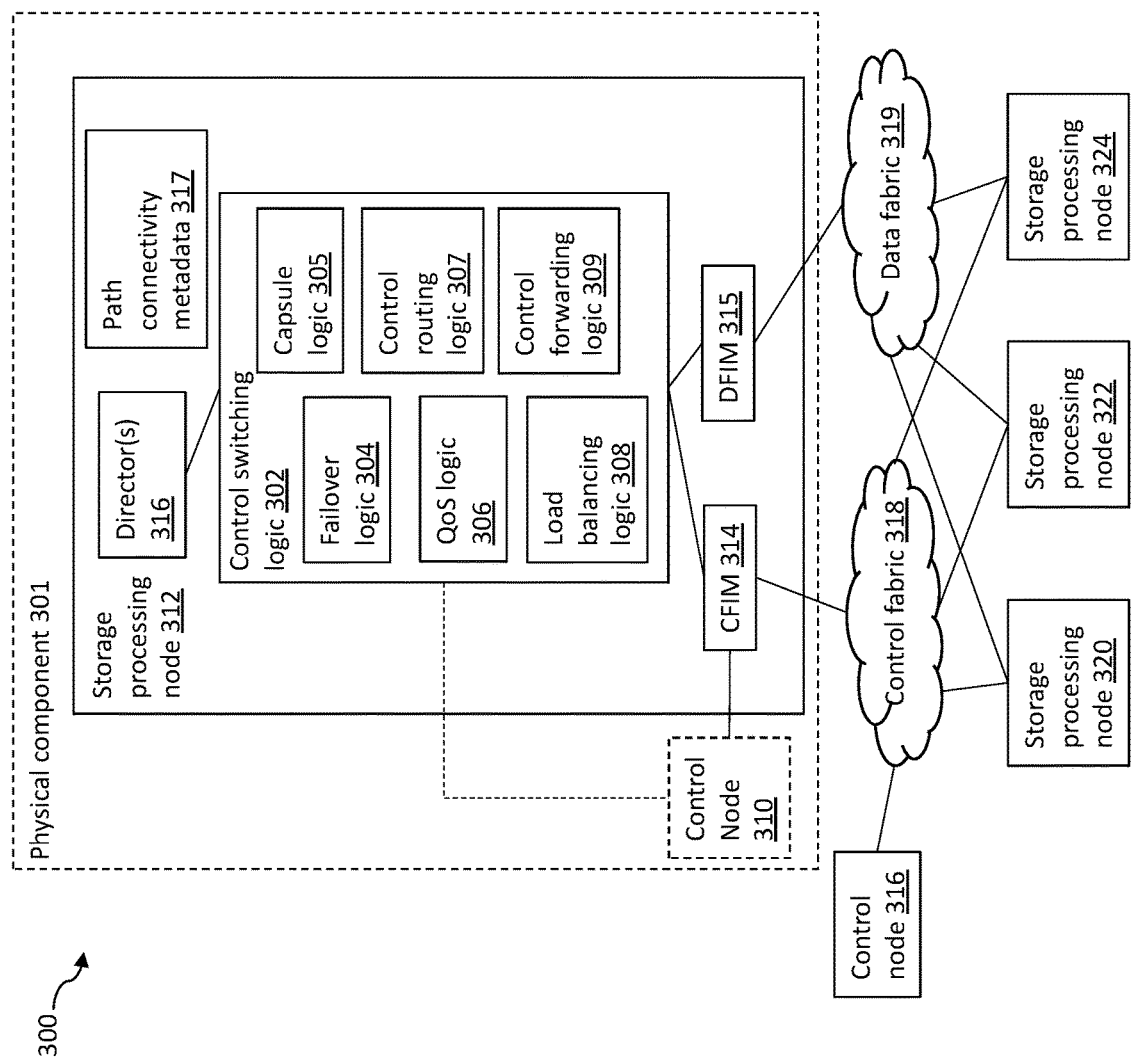
FIG. 3 is a block diagram illustrating a system for using a data path for control communications, according to embodiments of the invention.

FIG. 3 is a block diagram illustrating a system 300 for using a data path for control communications, according to embodiments of the invention. Other embodiments of a system for using a data path for control communications, for example, variations of the system 300, are possible and are intended to be covered by the scope of the invention.

The system 300 may include a plurality of storage processing nodes (SPNs) 312, 320, 322 and 324 of a storage system, each of which may implement functionality, and include one or more components, of any of the storage processing nodes 212a-n. Each of the plurality of SPNs 312, 320, 322 and 324 may be directly coupled to an internal data fabric 319 of the storage system, which may be, for example, internal fabric 230, and may be configured for high-speed performance, for example, in accordance with an IB standard.

Each of the SPNs 312, 320, 322 and 324 also may be directly coupled, along with control nodes 310 and 316, to an internal control fabric 318 of the storage system, which may be configured to implement a relatively slow Ethernet standard. However, each of the control nodes 310 and 316 may not be directly coupled to the data fabric 319. While four storage processing nodes and two control nodes are illustrated in FIG. 3, the invention is not so limited, as there may be more or less processing nodes and controls nodes.

The SPN 312 may include any of: one or more directors 316, control switching logic (CSL) 302, path connectivity metadata 317, a control fabric interface module (CFIM) 314 and a data fabric interface module (DFIM) 315. The DFIM 315 may be, for example, the FIM 215a, and may be configured for interfacing the SPN 312 to the data fabric 319. The DFIM 315 may include one or more host channel adapters (HCAs) that physically couple, and are configured to enable I/O processing communication between, the SPN 312 and the data fabric 319. In some embodiments, the data fabric 319 may include multiple (e.g., 2) switches, and each HCA 215a-n may have multiple (e.g., 2) ports, each one connected directly to one of the switches.

The CFIM 314 may include one or more adapters that physically couple, and are configured to enable management communication between, the SPN 312 and/or a control node 310 on the one hand and the control fabric 318. The control node 314 may reside on a same physical component 301 as the storage processing node 312. For example, the system 300 may be part of a Symmetrix, VMAX or PowerMax storage system, where the physical component 301 is an engine, the storage processing node 312 is a director board, and the control node 316 is a control station (e.g., part of a management module control station (MMCS)) residing on the same engine as the director board. In such embodiments, the storage system may include multiple engines (e.g., 2, 4, 8, etc.), and at least one of the engines may include one of more control stations embedded within or plugged into the engine. In some embodiments, at least one control node (e.g., the control node 316) may not reside within a same engine or other physical component as a storage processing node. For example, the control node may be, or be part of, a service processor of a Symmetrix or VMAX storage system that does not reside within the same engine as a director board. In such embodiments, the control fabric 318 or a portion thereof may reside on an engine as well, in the form of one or more management switch modules (MSMs).

The CSL 302 and components thereof (e.g., those described herein) may be configured to access path connectivity metadata 317. The path connectivity metadata 317 may include a plurality of data structures, for example, one or more tables, that define connectivity between the storage processing nodes (e.g., 312, 320, 322 and 324) and control nodes (e.g., 310, 316). Such path connectivity may be defined in any of a variety of ways, for example, in terms of port addresses or IDs (e.g., world-wide names (WWNs)) of ports of CFIMs and/or DFIMs and/or of one or more ports of switches within control fabric 318 and/or data fabric 319. For example, a definition of a control path between the storage processing node 312 and the control node 316 may be included in an entry in a table, where such entry specifies a port ID of a port of the CFIM 314 and a port ID of a port of the control node 316 that is physically coupled to the control fabric 318. Such a table entry may include other information, including, for example, one or more port IDs of a control fabric switch, and whether the control path is currently available or inactive. Similarly, a data path between the storage processing node 322 and the storage processing node 324 may be defined by an entry in a table (e.g., on each storage processing node), and specify a port ID of a DFIM of each storage processing node, and perhaps one or more port IDs of a data fabric switch, and whether data path is currently available or inactive.

In some embodiments of the invention, control paths between a control node and a storage processing may be modified to include a data fabric and another storage processing node by specifying a CFIM port and/or DFIM port of the other processing node as part of the control path definition. Control path information (and data path information) may be stored as part of port connectivity metadata 317 on each storage processing node and/or control node, and at least a portion of such information may be included in control and data communications to be consumed by a receiving storage processing node or control node to determine where to direct the communication.

The CSL 302 may be configured with logic to allow the storage processing node 312 to exchange management communications with control nodes 310 and 316 over data fabric 319 and one of the other storage nodes 320, 322, 324. The CSL 302 may include failover logic 304, QOS logic 306, load balancing logic 308, capsule logic 305 and control routing logic 307.

The failover logic 304 may be configured to trigger the exchange of management communications between the storage processing node 312 and one of the control nodes over the data fabric 319 and one of the other processing nodes 320, 322 or 324 in response to a failure of the control path between the storage processing node 312 and the control node that includes the control fabric 318.

The QoS logic 306 may be configured to trigger the exchange of management communications between the storage processing node 312 and one of the control nodes over the data fabric 319 and one of the other processing nodes 320, 322 or 324 to provide better quality of service for a management activity. The QoS logic may be capable of receiving input to trigger such an exchange and/or may be configured with access to business rules that define when to trigger such and exchange based on current and/or forecasted QoS desires or needs.

The load balancing logic 308 may be configured to trigger the exchange of management communications between the storage processing node 312 and one of the control nodes over the data fabric 319 and one of the other processing nodes 320, 322 or 324 to provide better load balancing of management activity on the storage system. The load balancing logic may be capable of receiving input to trigger such an exchange and/or may be configured with access to business rules that define when to trigger such an exchange based on current and/or forecasted management activity.

The capsule logic 305 may be configured to encapsulate control information configured in accordance with a communication protocol used by the control fabric 318 within a control communication configured in accordance with a communication protocol used by the data fabric 319, and to decapsulate such a control communication to obtain the control information, e.g., for transmission on the control fabric.

The control routing logic 307 may be configured to forward control communications it receives from the control node 316 over the control fabric 318 via the CFIM 314 that are destined for another storage processing node and need to be encapsulated and sent out over the data fabric 319 to the target storage system. The control routing logic 307 may access the path connectivity metadata 317 to determine path information and may utilize the capsule logic 305 for encapsulation.

The control forwarding logic 309 may be configured to forward control communications it receives from the data fabric 319 via the DFIM 315 that are destined for another storage processing node or a control node (e.g., and that are already encapsulated) to the control fabric 318 through the CFIM 314. The control forwarding logic 309 may access the path connectivity metadata 317 to determine path information.

Figure 4:
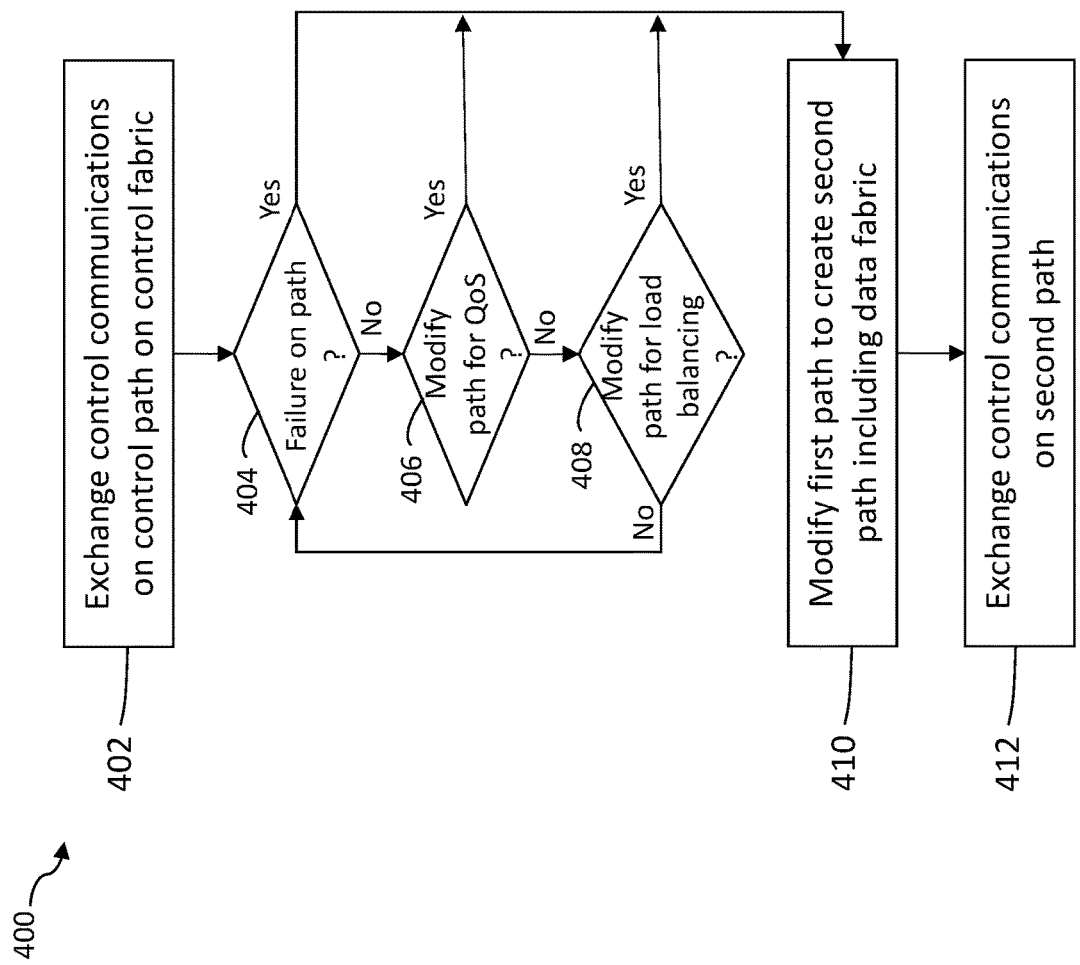
FIG. 4 is a flow chart illustrating a method of using a data path for control communications, according to embodiments of the invention.

The CSL 302 may be configured to implement the method 400, or parts thereof, described in relation to FIG. 4. It should be appreciated that the logic of one or more components of the CSL 302 may be integrated as part of a single component.

Each of the processing nodes 320, 322 and 324 may be configured to implement the same or similar functionality as, and include one or more of the same or similar components of, the storage processing nodes 312.

Each control node 310 and 316 may be configured with at least some of the same or similar logic as that of the failover logic 304, QoS logic 306 and load balancing logic 308. Each control node 310 and 316 also may be configured with logic to direct control communications to another storage processing node for transmission over the data fabric 319 if it determines that the control path between the control node and a target storage processing node has failed. Each control node 310 and 316 may access path connectivity metadata to determine path information.

FIG. 4 is a flow chart illustrating a method 400 of using a data path for control communications, according to embodiments of the invention. Other embodiments of a method of using a data path for control communications, for example, variations of the method 400, are possible and are intended to be covered by the scope of the invention.

In a step 402, control communications may be communicated on a first control path over a control fabric, for example, control fabric 318. In a step 404, it may be determined whether there is a failure on the first control path, for example, by failover logic 304. If it is determined that there is a failure, in a step 410 the first control path may be modified to create a second control path that includes a data fabric (e.g., the data fabric 319). In the step 412, control communications may be communicated on the second control path.

Figure 5A:
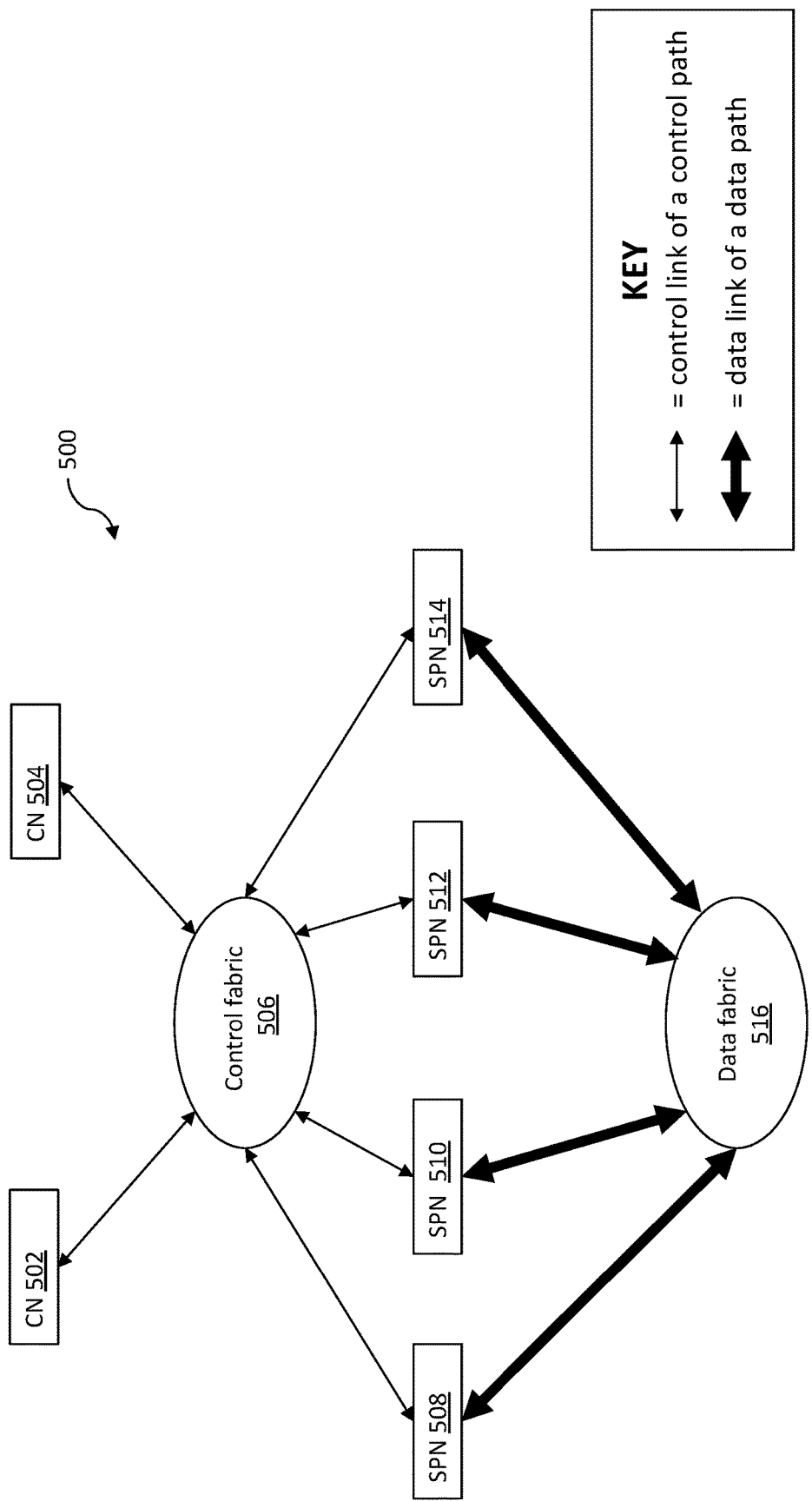
FIGS. 5A-5C illustrate an example of using a data path for control communications.
Figure 5B:
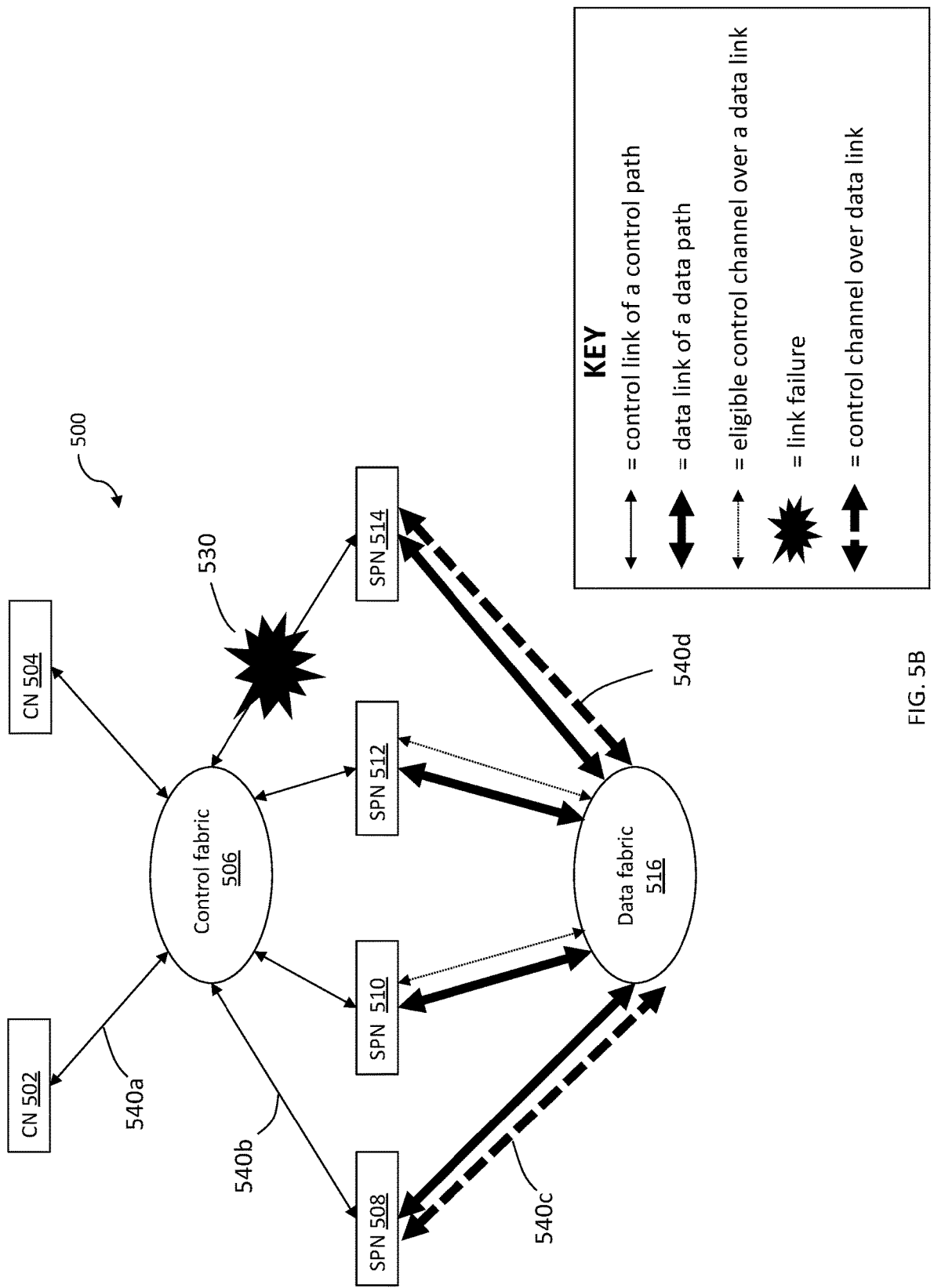
Figure 5C:
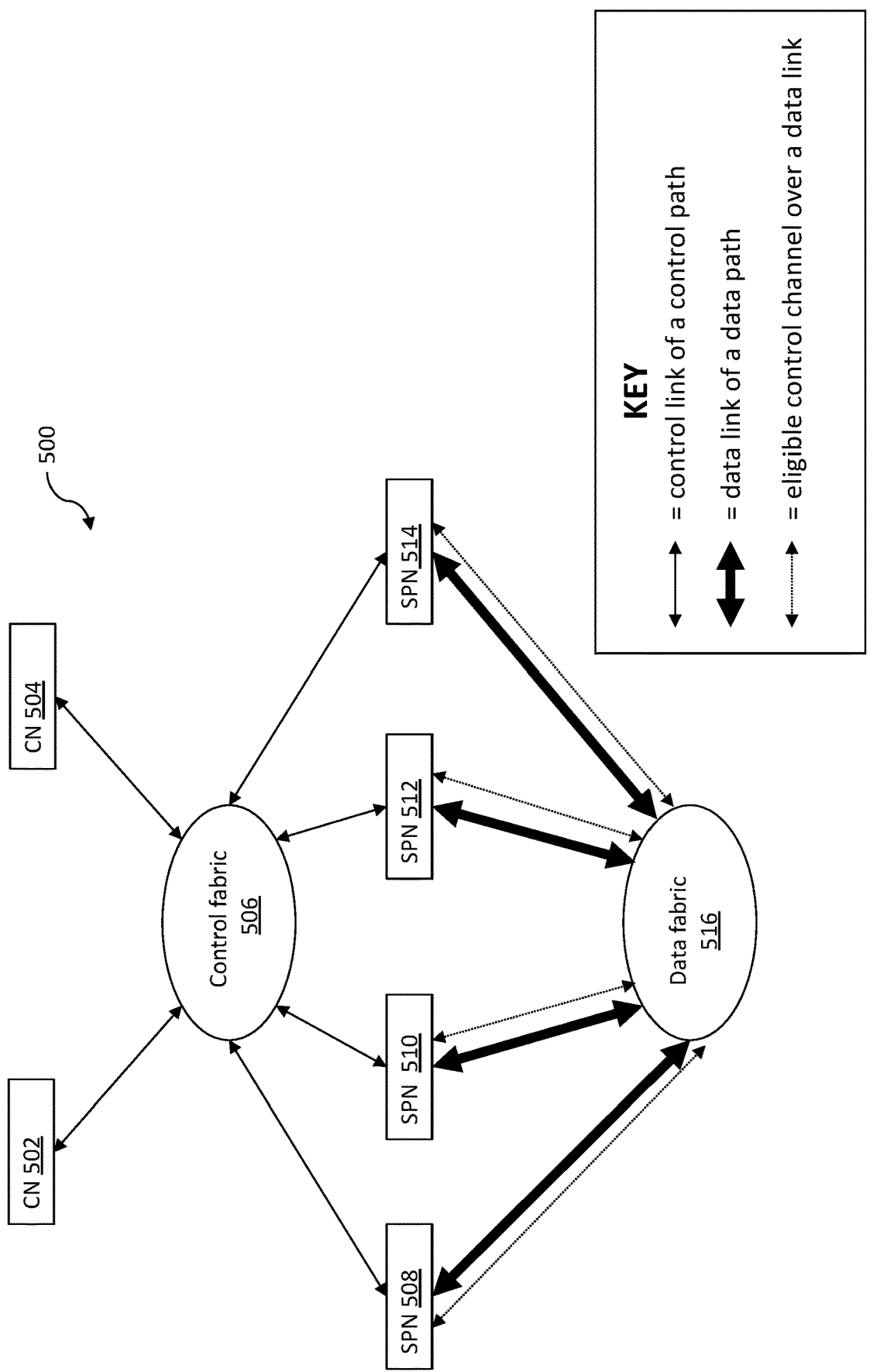

Consider the example illustrated in FIGS. 5A-5C. A system 500 (e.g., a portion of a storage system) includes two control nodes 502 and 504 having control links to a control fabric 506. SPNs 508, 510, 512 and 514 also have control links to the control fabric 506, as well as data links to data fabric 516, but control nodes 502 and 504 do not have data links to data fabric 516. In the event one of the control links between a control node and an SPN fail, there may be no way to exchange management communications between the control node and the SPN.

FIG. 5B shows an embodiment in which each of the data links between an SPN and the data fabric 516 may be configured to be eligible to provide a control channel over the data link. For example, path connectivity metadata 317 or the like may be configured to indicate the eligibility of a control channel over each data link.

FIG. 5C shows that a failure has occurred on the control link 530, disrupting the control path between control node 502 and SPN 514. The SPN 514 and/or the CN 502 may initiate the establishment of a control path between them that includes the control link 540a between the CN 502 and the control fabric 506, the control link 540 between the control fabric 506 and the SPN 508, a control channel 540c over the data link between the SPN 508 and the data fabric 516, and the control channel 540d over the data link 540d between the data fabric 516 and the SPN 514. For example, the failover logic of a CSL of the SPN 514 may access its path connectivity metadata to determine a data path over which control information can be created. Control information may be configured (e.g., using an Ethernet protocol) and encapsulated into a communication (e.g., configured in accordance with an IB protocol) by the capsule logic of the CSL. The communication also may include port IDs of the SPN 508 and/or data fabric switches, learned from the path connectivity metadata, and the communication sent to the data fabric 516, which routes the communication the SPN 508.

The SPN 508 may use it capsule logic to decapsulate the communication and read the control information. The SPN 508 then may access its path connectivity metadata if necessary based on the control information. The SPN 508 may configure and send a control communication including any necessary port information to the CN 502 over the control fabric 506, i.e. over control links 540b and 540a. The CN 502 may receive the control communication and take action based on the control information. A similar reciprocal process may be employed for sending a control communication from the control node 502 to the SPN 514. The process may be repeated for control communications between the control node 502 and the SPN 514. It should be appreciated that multiple other paths including other data links, the data fabric 516 and one of SPN 510 or 512, may be used.

Returning to the method 400, if it is determined in the step 404 that there is not a failure on the first control path, then in may be determined in a step 406 whether to modify the first control path to improve quality of service, for example, for a management activity involving communication on the first control path. If it is determined to modify the first control path to improve quality of service, then the method 400 may proceed to the step 410.

If it is determined to not modify the first control path to improve quality of service, then it may be determined in a step 408 whether to modify the first control path for better load balancing of management communications, for example, on the control fabric. If it is determined to modify the first control path for better load balancing of management communications, then the method 400 may proceed to the step 410. Otherwise, the method 400 may return to the step 404.

The performance of the steps 410 and 412 for improving QoS and load balancing may be the same, or very similar to the example described above in relation to FIGS. 5A-5C, and may involve the use of one or more new paths over one or more different data links and SPNs.

It should be appreciated that the steps 404-408 may be performed in an order other than as illustrated in FIG. 4. Further, while shown as occurring in series for illustrative purposes, the invention is not so limited. Each of the steps 404, 406 and 408 may be performed independently from the other steps, for example, in response to an event (e.g., link failure or a request for a software upgrade) or another phenomena (e.g., increased traffic on a control fabric).

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 400, or parts thereof, may be implemented using one or more of the systems and/or data structures described in relation to FIGS. 1-3 and 5A-5 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate operating system.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
exchanging first control communications between a control node of a storage system and a first I/O processing node of the storage system along a first communication path which is internal to the storage system and which includes a control fabric that is internal to the storage system, wherein the control fabric is configured for exchanging control communications between the control node and a plurality of I/O processing nodes of the storage system including the first I/O processing node and a second I/O processing node, and wherein each of the plurality of I/O processing nodes are communicatively coupled to a data fabric that is internal to the storage system and where the data fabric is physically separate and distinct from the control fabric, wherein the control node and the control fabric are separate and discrete physical components connected by a control link, and wherein the data fabric is used for processing I/O operations received at the storage system;
modifying the first communication path to produce a second communication path internal to the storage system, wherein the second communication path includes at least a segment of the data fabric used for processing I/O operations received at the storage system; and
exchanging second control communications between the control node and the first I/O processing node along the second communication path.

2. The method of claim 1, wherein said exchanging the second control communications includes, on at least the segment of the data processing network:
configuring the second control communications in accordance with a second communication protocol used by the data fabric; and
encapsulating control information configured in accordance with a first communication protocol used by the control fabric within the second control communications.

3. The method of claim 1, wherein said modifying the first communication path is performed in response to a failing of at least a part of the first communication path between the control node and the first I/O processing node.

4. The method of claim 3, wherein said modifying the first communication path includes adding the second I/O processing node to the first communication path to produce the second communication path.

5. The method of claim 1, further comprising:
determining to improve a quality of service for a control operation to be performed by the control node for the first I/O processing node,
wherein said modifying the first communication path is performed in response to the determining.

6. The method of claim 1, further comprising:
determining to reduce a load of control communications on the control network,
wherein said modifying the first communication path is performed in response to the determining.

7. The method of claim 1, wherein the data fabric is at least an order of magnitude faster than the control fabric.

8. The method of claim 1, wherein the storage system is a single physical system internally comprising the first communication path, the second communication path, the plurality of I/O processing nodes, the control node, the control fabric, the control link, and the data fabric.

9. A system comprising:
one or more processors; and
one or more computer-readable media comprising code stored thereon that, when executed, performs a method including:
exchanging first control communications between a control node of a storage system and a first I/O processing node of the storage system along a first communication path which is internal to the storage system and which includes a control fabric that is internal to the storage system, wherein the control fabric is configured for exchanging control communications between the control node and a plurality of I/O processing nodes of the storage system including the first I/O processing node and a second I/O processing node, and wherein each of the plurality of I/O processing nodes are communicatively coupled to a data fabric that is internal to the storage system and where the data fabric is physically separate and distinct from the control fabric, wherein the control node and the control fabric are separate and discrete physical components connected by a control link, and wherein the data fabric is used for processing I/O operations received at the storage system;
modifying the first communication path to produce a second communication path internal to the storage system, wherein the second communication path includes at least a segment of the data fabric used for processing I/O operations received at the storage system; and
exchanging second control communications between the control node and the first I/O processing node along the second communication path.

10. The system of claim 9, wherein said exchanging the second control communications includes, on at least the segment of the data processing network:
configuring the second control communications in accordance with a second communication protocol used by the data fabric; and
encapsulating control information configured in accordance with a first communication protocol used by the control fabric within the second control communications.

11. The system of claim 9, wherein said modifying the first communication path is performed in response to a failing of at least a part of the first communication path between the control node and the first I/O processing node.

12. The system of claim 11, wherein said modifying the first communication path includes adding the second I/O processing node to the first communication path to produce the second communication path.

13. The system of claim 9, wherein the method further includes:
determining to improve a quality of service for a control operation to be performed by the control node for the first I/O processing node,
wherein said modifying the first communication path is performed in response to the determining.

14. The system of claim 9, wherein the method further includes:
determining to reduce a load of control communications on the control network,
wherein said modifying the first communication path is performed in response to the determining.

15. The system of claim 9, wherein the data fabric is at least an order of magnitude faster than the control fabric.

16. One or more non-transitory computer-readable media having software stored thereon that, when executed, performs a method comprising:
exchanging first control communications between a control node of a storage system and a first I/O processing node of the storage system along a first communication path which is internal to the storage system and which includes a control fabric that is internal to the storage system, wherein the control fabric is configured for exchanging control communications between the control node and a plurality of I/O processing nodes of the storage system including the first I/O processing node and a second I/O processing node, and wherein each of the plurality of I/O processing nodes are communicatively coupled to a data fabric that is internal to the storage system and where the data fabric is physically separate and distinct from the control fabric, wherein the control node and the control fabric are separate and discrete physical components connected by a control link, and wherein the data fabric is used for processing I/O operations received at the storage system;
modifying the first communication path to produce a second communication path internal to the storage system, wherein the second communication path includes at least a segment of the data fabric used for processing I/O operations received at the storage system; and
exchanging second control communications between the control node and the first I/O processing node along the second communication path.

17. The one or more non-transitory computer-readable media of claim 16, wherein said exchanging the second control communications includes, on at least the segment of the data processing network:
configuring the second control communications in accordance with a second communication protocol used by the data fabric; and
encapsulating control information configured in accordance with a first communication protocol used by the control fabric within the second control communications.

18. The one or more non-transitory computer-readable media of claim 16, wherein said modifying the first communication path is performed in response to a failing of at least a part of the first communication path between the control node and the first I/O processing node.

19. The one or more non-transitory computer-readable media of claim 18, wherein said modifying the first communication path includes adding the second I/O processing node to the first communication path to produce the second communication path.

20. The one or more non-transitory computer-readable media of claim 16, wherein the method further comprises:
determining to improve a quality of service for a control operation to be performed by the control node for the first I/O processing node,
wherein said modifying the first communication path is performed in response to the determining.

21. The one or more non-transitory computer-readable media of claim 16, wherein the method further comprises:
determining to reduce a load of control communications on the control network, wherein said modifying the first communication path is performed in response to the determining.

* * * * *